United States Patent
Wardell

[15] 3,660,655
[45] May 2, 1972

[54] ION PROBE WITH MEANS FOR MASS ANALYZING NEUTRAL PARTICLES SPUTTERED FROM A SPECIMEN

[72] Inventor: Ian Robert Michael Wardell, Rugby, England

[73] Assignee: Associated Electrical Industries Limited, London, England

[22] Filed: Sept. 8, 1969

[21] Appl. No.: 871,794

Related U.S. Application Data

[63] Continuation of Ser. No. 703,600, Feb. 7, 1968, abandoned.

[52] U.S. Cl............250/41.9 SB, 250/41.9 SE, 250/41.9 ME, 250/49.5 P
[51] Int. Cl................H01j 37/26, H01j 39/34, B01d 59/44
[58] Field of Search.............250/49.5 P, 41.9 SE, 41.9 ME

[56] References Cited

UNITED STATES PATENTS 2,947,868   8/1960   Herzog.............................250/49.5 P

OTHER PUBLICATIONS

" 30 KeV Ion Bombardment Apparatus for Study of Interaction of Light Ions with Surfaces," McCracken et al., Review of Scientific Instruments, Vol. 37, No. 7, July, 1966.
" Method for Studying Sputtered Particles by Emission Spectroscopy," Erich Sawatzky, The Review of Scientific Instruments, Vol. 37, No. 10, Oct. 1966.

Primary Examiner—James W. Lawrence
Assistant Examiner—C. E. Church
Attorney—Watts, Hoffmann, Fisher & Heinke

[57] ABSTRACT

In micro-analyzer apparatus of the kind in which material to be analyzed is arranged as a target of an ion probe and ionized particles obtained from the target are analyzed in a mass spectrometer, accuracy of analysis is improved by analyzing not secondary ions sputtered from the target but neutral atoms which are collected and passed to the mass spectrometer through an ionizer. Several possible forms of ionizer for ionizing the sputtered neutrals are also disclosed.

25 Claims, 7 Drawing Figures

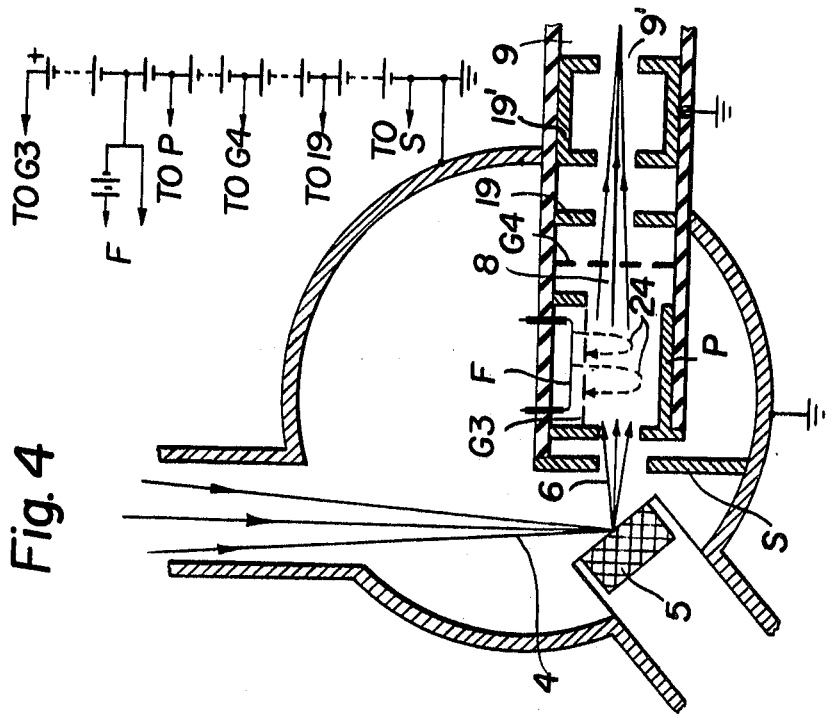
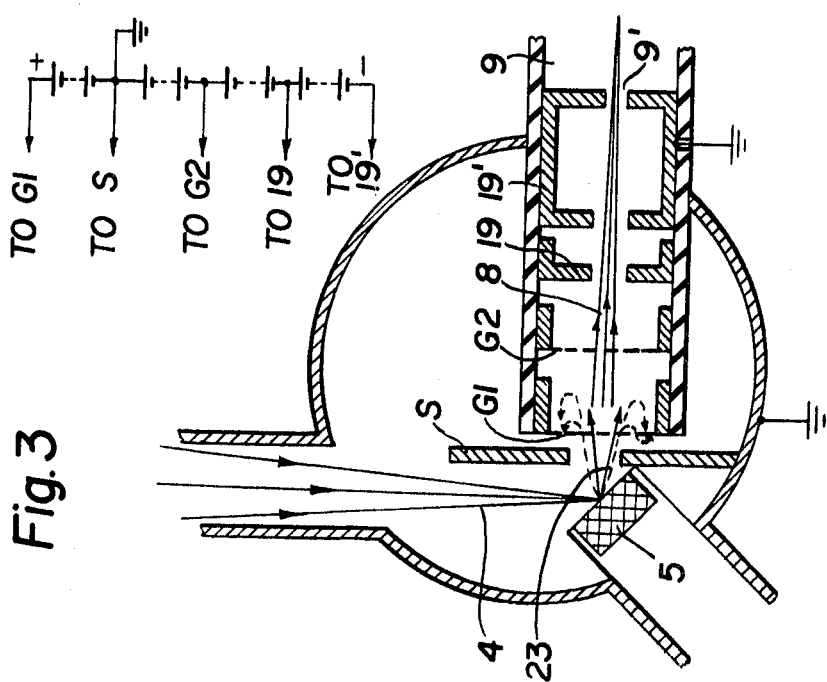

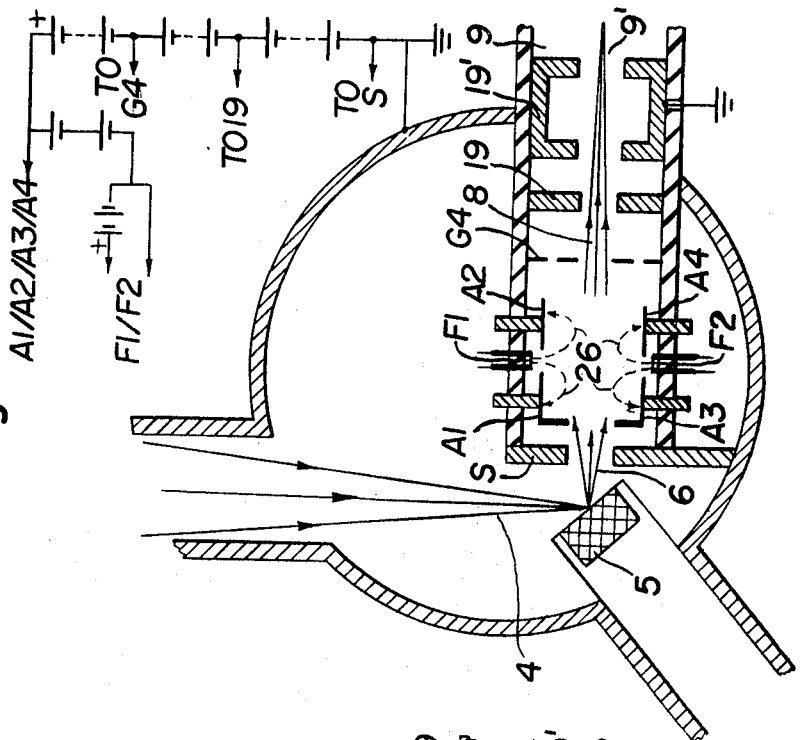
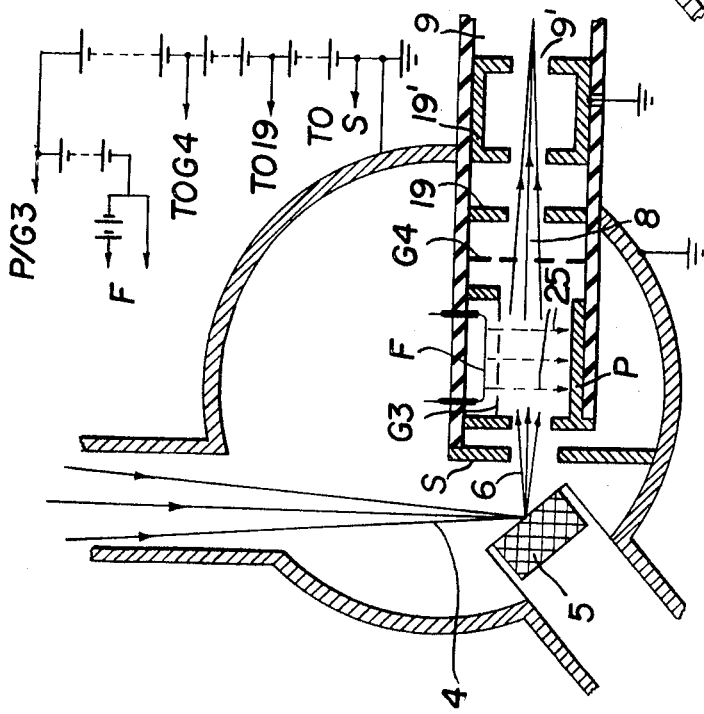

ION PROBE WITH MEANS FOR MASS ANALYZING NEUTRAL PARTICLES SPUTTERED FROM A SPECIMEN

This application is a continuation of application, Ser. No. 703,600, filed Feb. 7, 1968 for Improvement Relating To Ion Probe Target Analysis, now abandoned.

BACKGROUND OF THE INVENTION

1. Field of the Invention

This invention relates to apparatus of the kind in which material to be analyzed is arranged as a target for an ion beam or more especially an ion probe, the apparatus including a mass spectrometer for analyzing ionized particles which are obtained from the target and are representative of the composition of the target material.

2. Description of the Prior Art

When an ion beam impinges upon a target, particles in the form of secondary ions and neutral atoms of target material are sputtered (that is, dislodged) from the target. These secondary ions and neutral atoms (or "neutrals" as they are sometimes called) are representative of the target material and the secondary ions can be analyzed by a mass spectrometer to yield information about the chemical and isotopic constitution of the target. If an elementary area of the target surface is bombarded by an ion probe (that is, a finely focussed ion beam as distinct from a relatively diffuse ion beam bombarding the whole of the target surface) the analysis of the secondary ions yields information on the composition of the bombarded elementary area of the target. Thus by focussing on to the target an ion probe the diameter of which is limited only by the aberrations of the ion-optical probe forming system, the required rate of bombardment (ions per second) of the target, and the brightness of the ion source, it is possible to obtain secondary ions from a very small volume of target material and to perform a mass spectrometric analysis of these ions.

By scanning the ion probe over the target surface either along a line or following a raster or other two-dimensional pattern covering an area of the target, and by presenting the mass spectrometer output for a particular ion mass number synchronously with the scanning action, one can obtain a representation which reveals, in regard to the scanned line or area of the target, the spatial distribution of the particular element, isotope or molecule which gives rise to ions of that mass number. For instance by scanning the ion probe synchronously with a spot on a cathode ray tube and by modulating the brightness of the spot in accordance with the output of the mass spectrometer, a magnified distribution image of the target can be obtained on the cathode ray tube screen. The spatial resolution is approximately equal to the diameter of the ion probe.

If the position of incidence of the ion probe on the target is maintained constant, a point analysis of the elementary area of incidence can be obtained from the mass spectrometer.

The majority of the particles sputtered from a target by a primary ion probe are neutrals. No more than about 1 percent of the particles are sputtered as ions. Sputtered ion yields can vary by more than a factor of 10 not only from targets made of different pure elements but also from different targets made of the same pure element. It follows that quantitative analysis of a composite target using the sputtered ions produced by an ion probe is likely to be correspondingly inaccurate.

SUMMARY OF THE INVENTION

The yields of neutrals sputtered from a target by an ion probe do not exhibit the same large variations as do the ion yields. Accordingly it is proposed in accordance with the present invention, with a view to improving the quantitative accuracy of ion probe selected area or scanning analysis, to include between the target position and an ion analyzing mass spectrometer and ionizer which is positioned to receive and ionize sputtered neutrals from the target and to pass the resultant ionized neutrals into the mass spectrometer for analysis. This leads to a more accurate quantitative analysis because the proportion of neutrals of different kinds which are sputtered from a target of mixed composition is more closely directly related to the proportions of the atoms in the target than is the proportion of sputtered secondary ions. It is also possible that analysis of ionized sputtered neutrals rather than of sputtered ions will result in greater sensitivity: this is because there are many more neutrals than secondary ions — often many thousands of times more — but this will be offset to an extent determined by the inefficiency of the subsequent ionization process.

The invention also comprehends, as a separate unit, a source of ionized sputtered neutrals capable of attachment to a mass spectrometer for analysis of the ionized neutrals.

BRIEF DESCRIPTION OF THE DRAWINGS

In the accompanying drawings:

In FIG. 1 a block schematic mode of representation has been adopted because except for the introduction of the ionizer the general arrangement of the component parts corresponds to that already well-known for conventional ion probe micro-analyzers. It is therefore not necessary to instruct those who are skilled in the art as to the specific constructions of these parts. FIGS. 2 to 6 have also been drawn in a somewhat schematic manner because here again those skilled in the art will have no difficulty in devising specific constructions in which the various electrodes and other components are appropriately mounted and disposed. FIGS. 2 to 6 also include indications of the relative D.C. potentials applied to the several electrodes.

DESCRIPTION OF PREFERRED EMBODIMENTS

Figure 1:
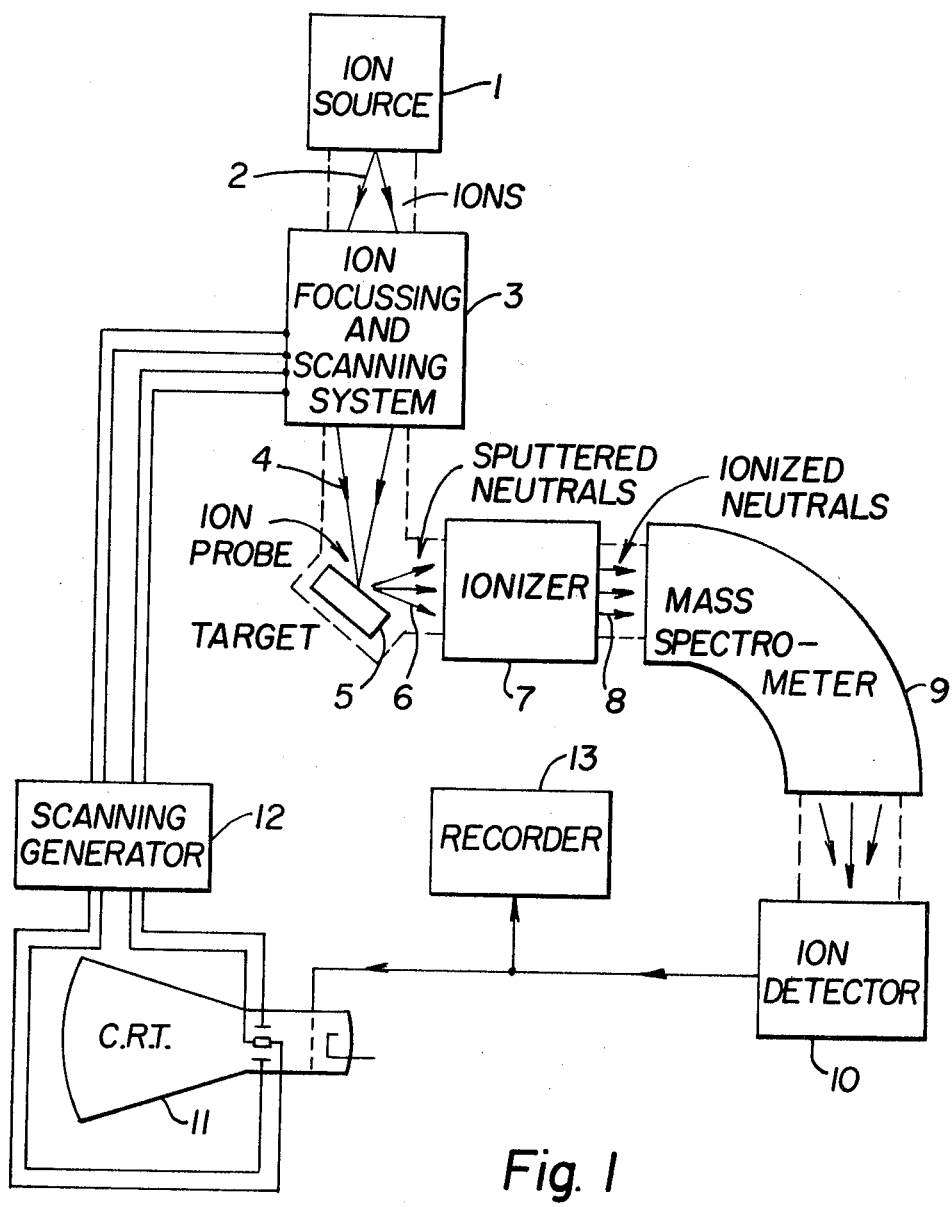
FIG. 1 illustrates an embodiment of the invention for scanning micro-analysis, and FIGS. 2 to 6 (including FIG. 2a) illustrate various possible arrangements for effecting the ionization of sputtered neutrals.

Referring to FIG. 1, an ion source 1 produces a stream of ions 2 which in an ion focussing and scanning section 3 are focussed into a primary ion probe 4. This ion probe impinges on an elementary area of a surface of a target 5. Sputtered neutrals 6, produced from the target 5 by the impingement of the ion probe 4 on it, are representative of the target composition in the area of impingement.

In accordance with the invention, these neutrals 6 are ionized in an ionization arrangement (ionizer 7) of which the target 5 may or may not constitute a component part. The ionized neutrals 8 enter a mass spectrometer 9 and are segregated therein according to their respective masses. Ionized neutrals of a particular mass, corresponding to a particular component of the target material, are selectively collected at the output of the mass spectrometer in the usual manner. It will be appreciated of course that the flight paths of the ions and neutrals are wholly within an evacuated enclosure as represented by the enclosing dotted lines. The electrical output of the ion collector 10 modulates the brightness of the spot on the screen of a cathode ray tube 11. An electrical scanning generator 12 causes the ion probe 4 to scan the target surface in a two-dimensional pattern and also controls the deflection of the cathode ray tube beam so that the spot is scanned over the screen in a similar pattern. Consequently an image of the distribution of the particular component of the target material over the scanned area of the target is displayed on the cathode ray tube screen.

A similar distribution image could be obtained by synchronously scanning a modulated light beam over a photographic plate, or in general by scanning a modulated energy beam over a display surface sensitive to the intensity of the beam. Alternatively or additionally, the output of the spectrometer ion collector 10 can be recorded by a recording apparatus 13.

The ion probe 4 will also cause sputtering of secondary ions from the target 5. These ions will be deflected by any magnetic or electric fields which exist close to the target and most of them will be lost to the walls of the vacuum enclosure. A small number of the secondary ions can be expected to enter the mass spectrometer 9 through the ionizer 7, but their number will in general be too small (in relation to the number of ionized neutrals) to cause any appreciable error in the mass spectrometer output.

The sputtered neutrals can be ionized in the ionizer 7 in any convenient manner. For this purpose they may for instance be bombarded with an electron beam, which may be more or less collimated or may be more or less diffuse and may be influenced by electric or magnetic fields to give an advantageous rate of ionization. Alternatively an electrostatic electrode configuration may be provided in the region of the target to cause ionization of the neutrals by secondary electrons that are ejected from the target material at the same time as the neutrals, in which case the electrode configuration may include the target itself. Another possibility is to locate a hot filament close to the target so as to ionize the neutrals by thermally emitted electrons. Yet again the neutrals may be caused to pass through an electron gas or a cloud of oscillating electrons or an electron stream. Some suitable ionizing arrangements for the ionizer 7 are schematically illustrated by way of example in FIGS. 2 to 6.

Figure 2A:
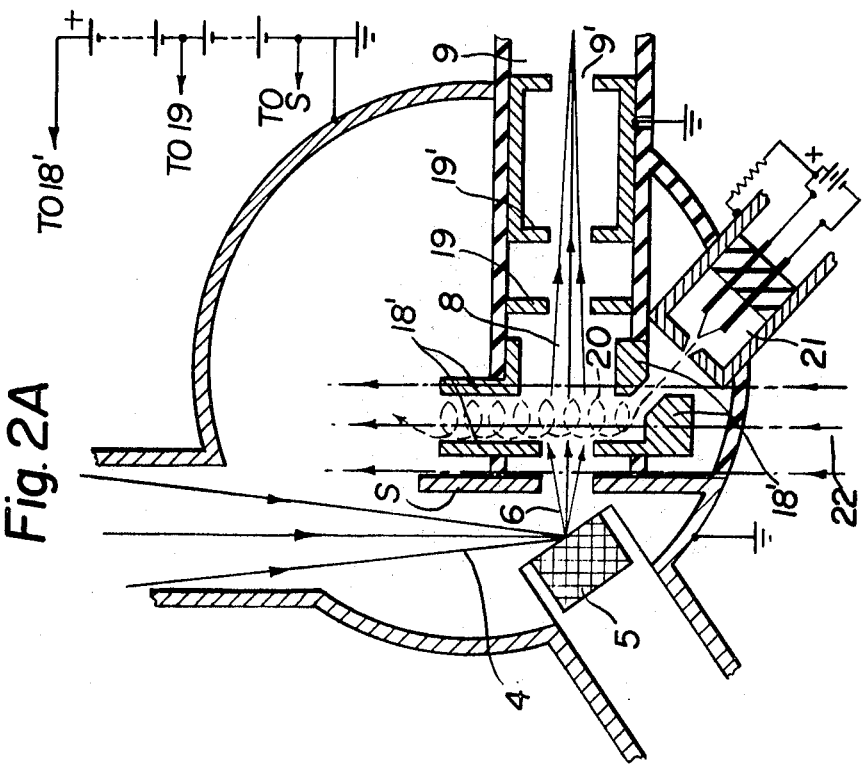
Figure 2:
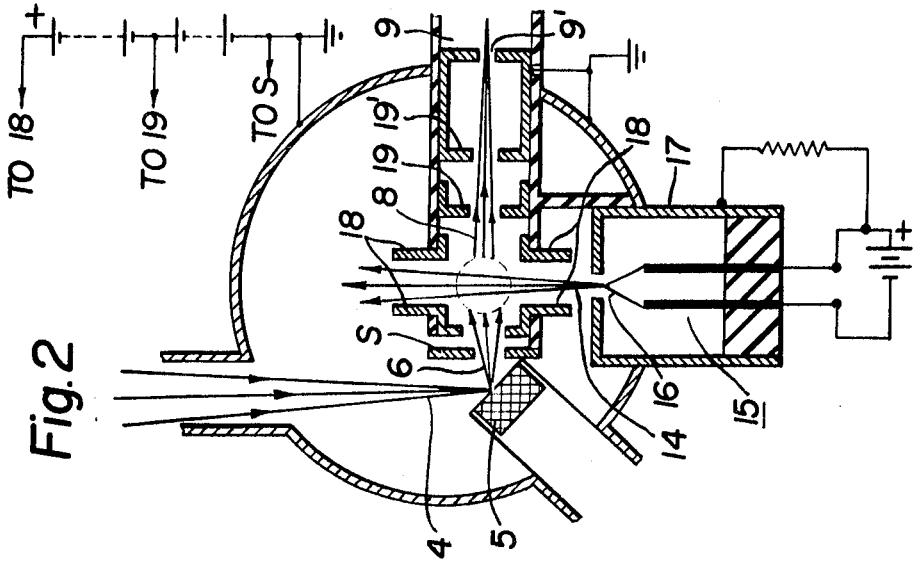

FIG. 2 illustrates an arrangement for ionization of the neutrals by means of an electron beam. In this arrangement the neutrals 6 which are sputtered from the target 5 towards the mass spectrometer 9 are intercepted and ionized by an electron beam 14 from an electron gun 15 aimed across the path of the neutrals 6. The gun 15 is shown as conventionally comprising an electron emitting hot filament 16, and a cathode structure 17 co-operating with an anode structure 18. At the position of interception (indicated by the dotted circle) a proportion of the neutrals are ionized by collision with the electrons. The ionized neutrals 8 are drawn by extraction electrodes 19, 19' towards the mass spectrometer 9, which they enter by way of an inlet slit 9' as is customary. In this embodiment, as in those still to be described, an earth shield S is included between the target 5 and the ionizer 7. This prevents the high voltages in the ionizer from affecting the trajectories of the ions in the ion probe 4.

FIG. 2a illustrates another electron beam ionizing arrangement in which, as a modification of the principle of operation of the FIG. 2 arrangement, an electron beam 20 from an electron gun 21 is caused to follow a spiral trajectory through the co-operating anode structure 18'. This is achieved by establishing a magnetic field acting on the electron beam in the direction indicated by the chain dotted lines 22. With this arrangement the electrons cross the path of the sputtered neutrals 6 more than once and are therefore available a corresponding number of times for the ionization of the neutrals.

FIG. 3 illustrates a possible electrode configuration for causing sputtered neutrals to be ionized by secondary electrons emitted from the target along with the neutrals. The secondary electrons, following trajectories such as indicated by the dotted lines at 23, are accelerated by a grid G1 which is held at a positive potential with respect to the target 5. Some of these electrons pass through the grid G1 and are turned back by a grid G2 held at a negative potential. Some of the electrons turned back may pass through the grid G1 in the reverse direction and then return towards it again. Some of the electrons may therefore in this manner oscillate several times but eventually most of them are collected by the grid G1. Some of the electrons cause ionization of neutrals in the region of the grid G1 and in the space between grids G1 and G2, and the positively ionized neutrals so produced are accelerated towards and through the negative grid G2 into the mass spectrometer 9.

FIG. 4 illustrates a possible configuration for the ionization of sputtered neutrals by thermally emitted electrons. Electrons emitted from a filament F and following trajectories such as indicated by the dotted lines at 24 are accelerated through a grid G3 towards a plate P. This plate P is held at a potential which is negative with respect to the filament potential, while the grid G3 is held at a positive potential with respect to the filament. The electrons return therefore towards the accelerating grid G3, by which they are finally collected. Neutrals 6 from the target 5, entering between the grid G3 and the plate P, are ionized by the electrons and are accelerated into the mass spectrometer 9 by a grid G4 which is held at a negative potential with respect to the plate and filament.

The arrangement of FIG. 5 is similar in construction to that of FIG. 4, but in this case both the plate P and the grid G3 are held at a positive potential with respect to the filament so that, as indicated by the dotted lines such as 25, most of the electrons pass across the path of the neutrals 6 and are collected on the plate P. In this case the exit grid G4 is held at a negative potential with respect to the grid G3 and plate P.

In the arrangement of FIG. 6 the neutrals 6 traverse the space between two pairs A1, A2 and A3, A4 of anode plates held at a positive potential relatively to two filaments F1 and F2 each located between and just outside of the two anode plates of a pair. Electrons from the filaments F1 and F2, following trajectories such as those typically indicated by the dotted lines such as 26, are accelerated into the space between the anode plates. Ionized neutrals are accelerated by the exit grid G4 out of this space into the mass spectrometer 9.

It is envisaged that certain of the ionizer arrangements illustrated, particularly those illustrated in FIGS. 2a, 3, 4 and 6 in which at least some of the ionizing electrons follow a re-entrant path in the region of interception with the neutrals and are therefore available more than once for ionization, may with advantage also be used in conjunction with target bombardment arrangments in which a diffuse ion beam is produced to bombard substantially the whole of the target surface, as distinct from an ion probe incident on only an elementary area of the target at any given instant.

I claim:

1. Apparatus for producing, for mass spectrometric analysis, ions representative of the composition of an elementary area of a body of material, which apparatus comprises the combination of means for producing an ion probe incident upon such elementary area of a target of said material, and an ionizer disposed to receive and ionize neutrals sputtered from the elementary target area by the ion probe, the ionizer having an exit through which the ionized neutrals constituting said representative ions can leave for entry into a mass spectrometer.

2. Apparatus according to claim 1 in combination with a mass spectrometer so disposed and arranged as to receive for analysis ionized neutrals leaving the ionizer.

3. Apparatus as claimed in claim 1 further comprising means for scanning the ion probe across a surface of the target whereby to render obtainable from a mass spectrometer disposed to receive the ionized neutrals during the scanning action an output representative of the spatial distribution of a particular component of the target material in the part of the target so scanned.

4. Apparatus as claimed in claim 3 in conjunction with a mass spectrometer so disposed, means for synchronously scanning an energy beam over a display surface sensitive to the intensity of such beam and means for modulating the intensity of the beam in accordance with said mass spectrometer output whereby to display said spatial distribution on said surface.

5. Apparatus as claimed in claim 3 in conjunction with a mass spectrometer so disposed, a cathode ray tube with a display screen, means for synchronously scanning an electron beam in said tube over its said screen, and means for modulating the intensity of said electron beam in accordance with said mass spectrometer output whereby to display said spatial distribution on the cathode ray tube screen.

6. Apparatus as claimed in claim 1 wherein said ionizer comprises means for creating, in the path of neutrals from the target, a region traversed by electrons capable of ionizing such neutrals by collision therewith.

7. Apparatus as claimed in claim 6 wherein said ionizer comprises an electron gun for producing an electron beam directed across the path of neutrals from the target whereby to create said ionizing region at the intersection of said beam with said path.

8. Apparatus as claimed in claim 6 wherein said ionizer comprises two mutually facing spaced pairs of anode plates defining said ionizing region between them and two electron emissive filaments disposed one behind each pair of anode plates and each in line with a gap defined between the anode plates of such pair for entry of electrons into said region due to attraction by the anode plates.

9. Apparatus as claimed in claim 6 wherein said ionizer comprises a longitudinally extending electron emissive filament, an electron accelerating grid in front of the filament, and an electron collecting plate spaced from the grid with said ionizing region defined therebetween.

10. Apparatus as claimed in claim 1 wherein said ionizer comprises means for creating, in the path of neutrals from the target, a region traversed a plurality of times by electrons capable of ionizing such neutrals by collision therewith.

11. Apparatus as claimed in claim 10 wherein said ionizer comprises an electron gun directed into said ionizing region and magnet means for establishing a magnetic field effective in said region to cause electrons therein from said gun to travel spirally.

12. Apparatus as claimed in claim 10 wherein said ionizer comprises a first grid for attracting to and through it secondary electrons emitted from the target due to the ion impingement, said first grid also passing neutrals from the target, and a second grid spaced beyond the first for attracting ionized neutrals through it towards the mass spectrometer while repelling back towards the first grid electrons passed through it, said ionizing region being defined between said grids.

13. Apparatus as claimed in claim 10 wherein said ionizer comprises a longitudinally extending electron emissive filament, an electron accelerating grid in front of the filament, and an electron repelling plate spaced from the grid with said ionizing region defined therebetween.

14. An ionizer suitable for apparatus as claimed in claim 1 and comprising an electron gun directed into an ionizing region for neutral particles entering said region, and magnet means for establishing a magnetic field effective in said region to cause electrons therein from said gun to travel spirally.

15. An ionizer suitable for apparatus as claimed in claim 1 and comprising a first grid maintainable at a potential for attracting to and through it secondary electrons emitted from a target along with neutrals which this grid can also pass, and a second grid spaced beyond the first to define an ionizing region therebetween and maintainable at a relatively negative potential for attracting ionized neutrals through it while repelling back towards the first grid electrons passed through the latter.

16. An ionizer suitable for apparatus as claimed in claim 1 and comprising a longitudinally extending electron emissive filament, an electron accelerating grid in front of the filament, an electrode plate spaced from the grid to define therebetween an ionizing region for neutral particles entering the region at one end, and an accelerating grid at the other end of said region for attracting ionized neutrals out of it.

17. A method of producing for mass spectrometric analysis, ions representative of the composition of an elementary area of a body of material, comprising the steps of:
   a. producing an ion probe incident upon an elementary target area of said material and sputtering neutrals therefrom;
   b. ionizing said sputtered neutrals to produce said ions representative of said composition; and
   c. directing said ions representative of said composition through an exit for analysis.

18. The method of claim 17, further including the step of providing said ions from said exit to a mass spectrometer.

19. The method of claim 18, further including the step of scanning the ion probe across a surface of the target, whereby to render obtainable from the mass spectrometer an output representative of the spatial distribution of a particular component of the target material in the part of the target so scanned.

20. The method of claim 19, further including the steps of synchronously scanning an energy beam over a display surface sensitive to the intensity of such beam and modulating the intensity of the beam in accordance with the mass spectrometer output, whereby to display said spatial distribution on said surface.

21. The method of claim 19, further including the steps of synchronously scanning an electron beam in a cathode ray tube over a display screen in said tube, and modulating the intensity of said electron beam in accordance with said mass spectrometer output, whereby to display said spatial distribution on the cathode ray tube screen.

22. The method of claim 17, wherein the step of ionizing said sputtered neutrals includes directing said sputtered neutrals through a region traversed by electrons capable of ionizing such neutrals by collision therewith.

23. The method of claim 22, wherein said region is caused to be traversed a plurality of times by electrons capable of ionizing such neutrals by collision therewith.

24. The method of claim 22, further including the step of establishing a magnetic field effective in said region to cause electrons therein to travel spirally.

25. The method of claim 17, further including the step of repelling from said exit secondary electrons sputtered from a target along with said neutrals.

* * * * *